United States Patent
Kitamura et al.

(10) Patent No.: US 10,962,959 B2
(45) Date of Patent: Mar. 30, 2021

(54) RELAY, CONTROL METHOD, AND NON-TRANSITORY COMPUTER-READABLE RECORDING MEDIUM FOR POWER SUPPLY CONTROL

(71) Applicant: OMRON Corporation, Kyoto (JP)

(72) Inventors: Yasuhiro Kitamura, Ritto (JP); Toshiyuki Ozaki, Ritto (JP); Keiichi Teranishi, Numazu (JP)

(73) Assignee: OMRON Corporation, Kyoto (JP)

( * ) Notice: Subject to any disclaimer, the term of this patent is extended or adjusted under 35 U.S.C. 154(b) by 269 days.

(21) Appl. No.: 15/751,465

(22) PCT Filed: Dec. 6, 2016

(86) PCT No.: PCT/JP2016/086253
§ 371 (c)(1),
(2) Date: Feb. 8, 2018

(87) PCT Pub. No.: WO2017/158953
PCT Pub. Date: Sep. 21, 2017

(65) Prior Publication Data
US 2018/0239338 A1     Aug. 23, 2018

(30) Foreign Application Priority Data
Mar. 14, 2016   (JP) ............................. JP2016-049317

(51) Int. Cl.
*G05B 19/414*     (2006.01)
*G05B 19/042*     (2006.01)
(Continued)

(52) U.S. Cl.
CPC ........... *G05B 19/4145* (2013.01); *G05B 9/02* (2013.01); *G05B 19/0423* (2013.01);
(Continued)

(58) Field of Classification Search
CPC ............ G05B 19/4145; G05B 19/0423; G05B 19/4184; G05B 9/02; G05B 2219/33196;
(Continued)

(56) References Cited

U.S. PATENT DOCUMENTS

| 5,963,444 A * | 10/1999 | Shidara ................ G05B 19/052 700/7 |
| 2012/0330478 A1* | 12/2012 | Malsch .............. G05B 19/4185 700/297 |
| 2014/0215252 A1* | 7/2014 | Fullerton ............. H03K 19/096 713/324 |
| 2015/0372539 A1* | 12/2015 | Livadaras .............. G05B 15/02 700/297 |

FOREIGN PATENT DOCUMENTS

| JP | 2012198841 | 10/2012 |
| JP | 2013-20577 | 1/2013 |

(Continued)

OTHER PUBLICATIONS

Matsumoto, Field Network System, 2012, Machine translation of JP2012198841A (Year: 2012).*
(Continued)

*Primary Examiner* — Thomas C Lee
*Assistant Examiner* — Charles Cai
(74) *Attorney, Agent, or Firm* — JCIPRNET

(57) ABSTRACT

The purpose of the present invention is to stop the power supply to a specified device among a plurality of devices to be supplied with power, and maintain the power supply to the other device. An IO-Link master is provided with: an upper-level communication control unit which receives a specification of a device to which the power supply is to be stopped; and a power supply control unit which controls a device power supply switching unit corresponding to the device to which the power supply is to be stopped, to stop the power supply to said device while maintaining the power supply to the other device.

12 Claims, 10 Drawing Sheets

(51) Int. Cl.
 H04L 12/10 (2006.01)
 G05B 19/418 (2006.01)
 H04L 12/12 (2006.01)
 G05B 9/02 (2006.01)
 H04N 1/00 (2006.01)

(52) U.S. Cl.
 CPC .......... *G05B 19/4184* (2013.01); *H04L 12/10* (2013.01); *H04L 12/12* (2013.01); *H04N 1/00204* (2013.01); *H04N 1/00281* (2013.01); *H04N 1/00408* (2013.01); *H04N 1/00901* (2013.01); *G05B 2219/33196* (2013.01); *G05B 2219/34315* (2013.01); *Y02P 90/02* (2015.11)

(58) Field of Classification Search
 CPC .......... G05B 2219/34315; H04L 12/10; H04L 12/12; H04N 1/00204; H04N 1/00281; H04N 1/00408; H04N 1/00901; Y02P 90/02; Y02D 30/50
 See application file for complete search history.

(56) References Cited

FOREIGN PATENT DOCUMENTS

| | | |
|---|---|---|
| JP | 2014-135862 | 7/2014 |
| JP | 2014-137607 | 7/2014 |
| JP | 2016-24191 | 2/2016 |

OTHER PUBLICATIONS

"International Search Report (Form PCT/ISA/210)" of PCT/JP2016/086253, dated Mar. 7, 2017, with English translation thereof, pp. 1-4.

"Written Opinion of the International Searching Authority (Form PCT/ISA/237)" of PCT/JP2016/086253, dated Mar. 7, 2017, with English translation thereof, pp. 1-8.

"Search Report of Europe Counterpart Application", dated Oct. 11, 2019, p. 1-p. 6.

\* cited by examiner

RELAY, CONTROL METHOD, AND NON-TRANSITORY COMPUTER-READABLE RECORDING MEDIUM FOR POWER SUPPLY CONTROL

CROSS-REFERENCE TO RELATED APPLICATION

This application is a 371 of international application of PCT application serial no. PCT/JP2016/086253, filed on Dec. 6, 2016, which claims the priority benefit of Japanese application serial no. 2016-049317, filed on Mar. 14, 2016. The entirety of each of the above-mentioned patent applications is hereby incorporated by reference herein and made a part of this specification.

TECHNICAL FIELD

The present invention relates to a relay device relaying data between a control device and a device in a factory automation (FA) system and, more particularly, to a relay device that controls the supply of power to a device while also relaying data to the device.

BACKGROUND ART

Generally, an FA system includes a master device (control device), a slave device (relay device), and devices such as a sensor and the like. The master device controls the operations of the devices and receives output data of the devices through the slave device. Conventionally, improvements of such FA systems have progressed. As one such improvement of the FA systems, there is an improvement relating to the supply of power. For example, in the following Patent Literature 1, in a slave controller (equivalent to the slave device described above), a technology for achieving power saving while securing security by controlling the supply of power from a network power supply used for maintaining a network connection with another slave controller in accordance with a voltage of a main power supply has been disclosed.

CITATION LIST

Patent Literature

[Patent Literature 1]
Japanese Unexamined Patent Application Publication No. 2013-20577 (published on Jan. 31, 2013)

SUMMARY OF INVENTION

Technical Problem

In a conventional FA system, there is a problem in that, when the supply of power from a power supply for operating a device is stopped, the supply of power to all the devices connected to a slave device is stopped. For this reason, for example, in a case in which one device is being replaced, the supply of power to the other devices is stopped as well, which is inefficient.

Particularly, in recent years, as a communication protocol of an FA system, an IO-Link (registered trademark) protocol is frequently used. In a case in which the IO-Link protocol is used, the number of devices that can be connected to one slave device increases, and the problem described above becomes more prominent.

In addition, while a method of replacing a device without stopping the supply of power may be considered, in a case in which the device is an output device such as an actuator, if a device is replaced while power is supplied thereto, there is a possibility that the device will operate immediately after the replacement, which is dangerous. Particularly, in a case in which the IO-Link protocol is used, the use of output devices is predicted to increase, and thus the problem described above will become more prominent.

However, in the conventional technology described above, a means for solving such problems is not disclosed.

The present invention is made in view of the problems described above, and an object thereof is to realize a relay device and the like capable of stopping the power supply of designated devices among a plurality of devices that are targets for the supply of power, while maintaining the power supply of the other devices.

Solution to Problem

In order to solve the problems described above, according to one aspect of the present invention, there is provided a relay device that relays data between a control device and a plurality of devices that are control targets of the control device and controls the power supply of the plurality of devices and has a configuration including: a designation receiving unit that receives designation of a target device that is a target for stopping the power supply; a plurality of power supply state switching units that correspond to the plurality of devices; and a power supply control unit that stops the power supply of the target device in a state in which the power supply of the other devices is maintained by controlling the power supply state switching unit corresponding to the target device.

In addition, in order to solve the problems described above, according to one aspect of the present invention, there is provided a control method for a relay device that relays data between a control device and a plurality of devices that are control targets of the control device and controls the power supply of the plurality of devices, the control method including: a designation receiving step of receiving designation of a target device that is a target for stopping the power supply; and a power supply control step of stopping the power supply of the target device in a state in which the power supply of the other devices is maintained by controlling a power supply state switching unit corresponding to the target device among a plurality of power supply state switching units that correspond to the plurality of devices.

Advantageous Effects of Invention

According to one aspect of the present invention, there is an effect that the power supplied to designated devices among a plurality of devices that are targets for the power supply can be stopped and the power supplied to the other devices is maintained.

DESCRIPTION OF EMBODIMENTS

Embodiment 1

Embodiment 1 of the present invention will be described with reference to FIGS. 1 to 4.

[System Overview]

Figure 2:
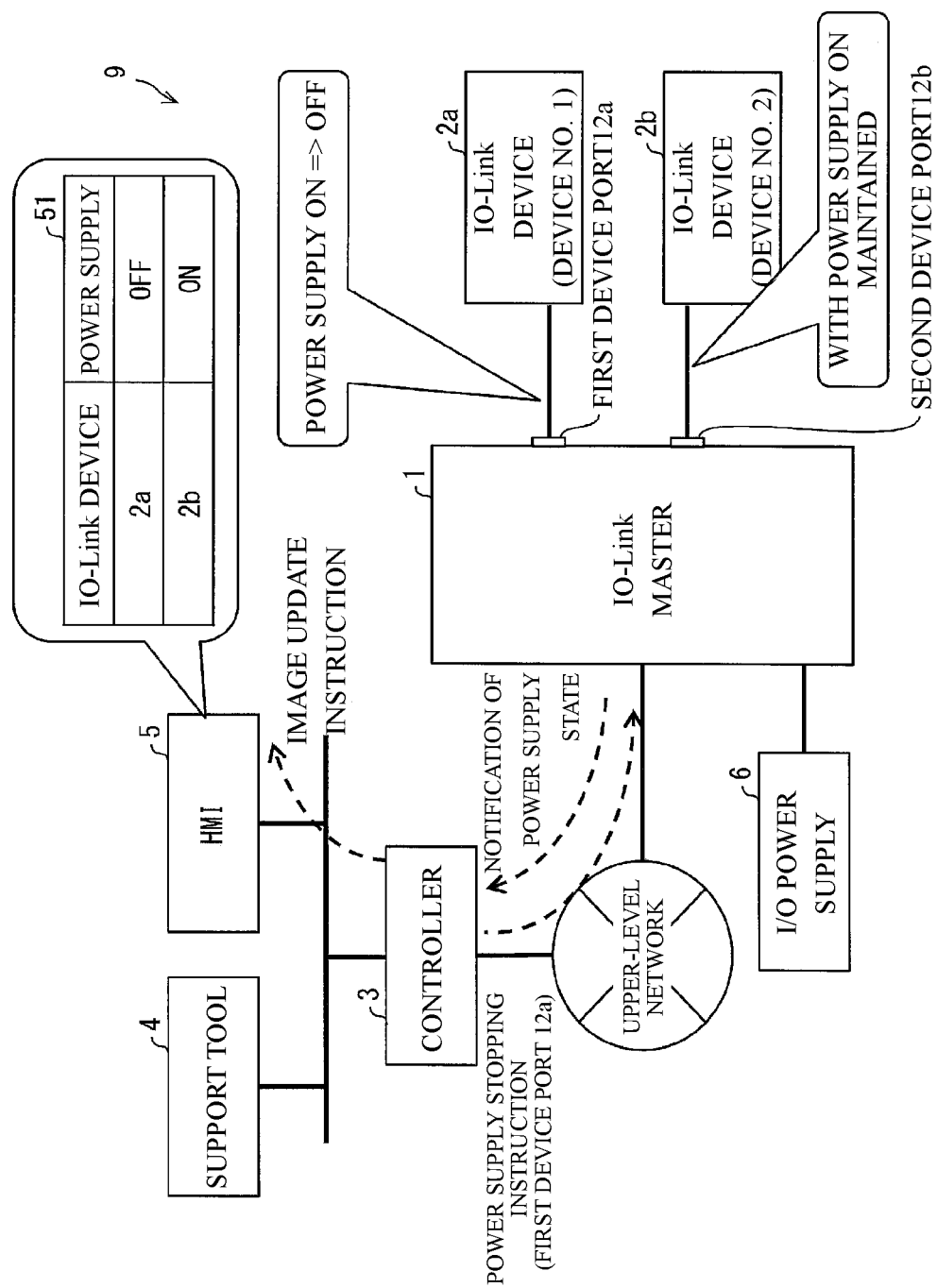
FIG. 2 is diagram illustrating an overview of an IO-Link system according to Embodiment 1 of the present invention.

First, an overview of an IO-Link system according to this embodiment will be described with reference to FIG. 2. FIG. 2 is a diagram illustrating an overview of an IO-Link system 9. The IO-Link system 9 is an FA system, and an IO-Link master 1 (relay device), an IO-Link device 2a, an IO-Link device 2b, a controller 3 (control device), a support tool 4, and an HMI 5 (display input device) are included in the IO-Link system 9 as illustrated in the drawing. When the IO-Link devices 2a and 2b do not need to be distinguished from each other, each will be denoted as an IO-Link device 2.

The IO-Link master 1 is a relay device that relays data between an upper-level network including a controller 3 and the IO-Link device 2 (device) and operates as a slave device of the controller 3 in the IO-Link system 9. Although two IO-Link devices 2 are connected to the IO-Link master 1 in the example illustrated in the drawing, three or more IO-Link devices 2 may be connected thereto. In addition, the IO-Link master 1 can bidirectionally communicate with the IO-Link device 2. In addition, in this embodiment, there are cases in which a port of the IO-Link master 1 to which the IO-Link device 2a is connected is described as a first device port 12a and a port of the IO-Link master 1 to which the IO-Link device 2b is connected is described as a second device port 12b in order to distinguish them.

The IO-Link device 2 is a device that is communicably connected to the IO-Link master 1 and is a control target of the controller 3. As the IO-Link device 2, an output device and an input device may be applied. Examples of the input device include various sensors such as a photoelectric conversion sensor and a proximity sensor, and examples of the output system include an actuator, a monitor, and the like. In addition, a conversion device such as an inverter and the like may be set as IO-Link devices 2.

The controller 3 is a control device that integrally controls the overall operation of the IO-Link system 9 and is also called a programmable logic controller (PLC). The controller 3 operates as a master device of the IO-Link master 1 in the IO-Link system 9.

The support tool 4 is a device that is used while connected to the IO-Link system 9 for various settings in the IO-Link system 9 such as an operation setting of the IO-Link device 2 and the like. The support tool 4 can be connected to the IO-Link system 9 through the controller 3. As the support tool 4, an information processing device such as a PC can be used, and an information processing device of a portable type such as a notebook computer can be used.

The HMI 5 is a display input device of a touch panel type. A user using the IO-Link system 9 can operate the controller 3 through the HMI 5 or can check the operation state of the IO-Link system 9 in the HMI 5.

An I/O power supply 6 is a power supply used for supplying power to the IO-Link device 2. The I/O power supply 6, as illustrated in the drawing, is connected to the IO-Link master 1 and supplies power to the IO-Link device 2 through a wiring connecting the IO-Link master 1 and the IO-Link device 2.

In the IO-Link system 9 having the above configuration, the IO-Link master 1, as illustrated in the drawing, stops the supply of power to the IO-Link device 2 in accordance with the reception of a power supply stopping instruction used for stopping the power supply of the IO-Link device 2 from the controller 3. In more detail, the IO-Link master 1 acquires information (port information) representing a port to which the IO-Link device 2 that is a target for stopping the power supply is connected from the controller 3 together with the power supply stopping instruction and stops the power supply of the IO-Link device 2 that is connected to the port represented by the port information. In the example illustrated in the drawing, the IO-Link master 1 acquires port information representing the first device port 12a together with the power supply stopping instruction and stops the power supply of the IO-Link device 2a.

At this time, as illustrated in the drawing, the power supply of the IO-Link device 2b is not stopped. In other words, the IO-Link master 1 can stop the power supply of only the designated IO-Link devices 2 among a plurality of IO-Link devices 2 that are targets for the supply of power while maintaining the power supply of the other IO-Link devices 2.

In addition, when the power supply of the designated IO-Link devices 2 is completely stopped, as illustrated in the drawing, the IO-Link master 1 notifies the controller 3 of a power supply state of each IO-Link device 2 (in other words, outputs a power supply state notification to the controller 3). When the notification is received, the controller 3 directs updating of an image 51 representing the status of the power supply of the IO-Link device 2 displayed in the HMI 5 (in other words, outputs an image update instruction to the HMI 5). The HMI 5 receives the instruction, updates the image 51 and displays the updated image 51. The image 51 is a table in which information (in the example illustrated in the drawing, a component number) representing each IO-Link device 2 and information (in the example illustrated in the drawing, on or off) representing whether or not power is supplying to the IO-Link device 2 are displayed in association with each other. However, the image 51 illustrated in the drawing is merely one example. The image 51 may be any image representing the status of the power supply of the IO-Link devices 2 and is not limited to the example illustrated in the drawing. In the example illustrated in the drawing, it is illustrated that the image 51 is updated, and the power supply of the IO-Link device 2a is stopped (in other words, the supply of power to the IO-Link device 2a is turned off).

[IO-Link]

The IO-Link will be additionally described below. The IO-Link is standardized under the name "Single-drop digital communication interface for small sensors and actuators" (SDCI) in IEC61131-9 and is a standardized technology for communication between a master that is a control device (the controller 3 described above is equivalent to this) and a device such as a sensor, an actuator, or the like. The IO-Link is a new point-to-point serial communication protocol used for communication between the master and a device. Examples of the device include a photoelectric conversion sensor and a proximity sensor.

The IO-Link is different from a conventional protocol enabling only transmission of an on/off signal (one bit) from a device to a master, that the IO-link is a communication protocol capable of transmitting and receiving (bidirectional communication) 32-byte (256-bit) data. While conventionally only binary data such as on/off information can be received as a signal from a device, by linking a master and a device using an IO-Link, numerical data of 32 bits can be acquired. Accordingly, for example, in the case of a photoelectric conversion sensor, information such as the amount of received light, a detection margin, and an internal temperature can be acquired, and thus, in addition to supporting investigation of the cause of a defect, determination of a product life, change of a threshold value according to aging degradation, and the like can be performed.

By using the IO-Link, for example, the setting, the maintenance, and the like of devices can be automated. In addition, by using the IO-Link, the programming of the master can be drastically simplified, and reduction in the cost of the wiring cable and the like can be realized.

Next, an IO-Link system using the IO-Link described above (the IO-Link system 9 described above is equivalent to this) will be described. The IO-Link system is configured by an IO-Link device (generally, a sensor, an actuator, or a combination thereof, and the IO-Link device 2 are equivalent to this), a standard three-wire type sensor/actuator cable, and an IO-Link master (the IO-Link master 1 is equivalent to this).

The IO-Link master includes one or a plurality of ports (device ports 12 to be described later are equivalent to these), and one IO-Link device can be connected to each port. The IO-Link master executes point-to-point communication with the IO-Link device. The IO-Link master can transmit/receive not only binary data (data of one bit) such as conventional on/off data but also information (data larger than one bit) such as identification information of a device, a communication property of a device, a device parameter, and information of process diagnosis data to/from an IO-Link device.

The IO-Link device can transmit/receive data larger than one bit to/from the IO-Link master. In other words, the IO-Link device is a device that is appropriate for the IO-Link. In addition, in the IO-Link system, a device such as a sensor or an actuator other than an IO-Link device (not transmitting/receiving data larger than one bit) can be embedded.

[Main Configuration of IO-Link Master 1]

Figure 1:
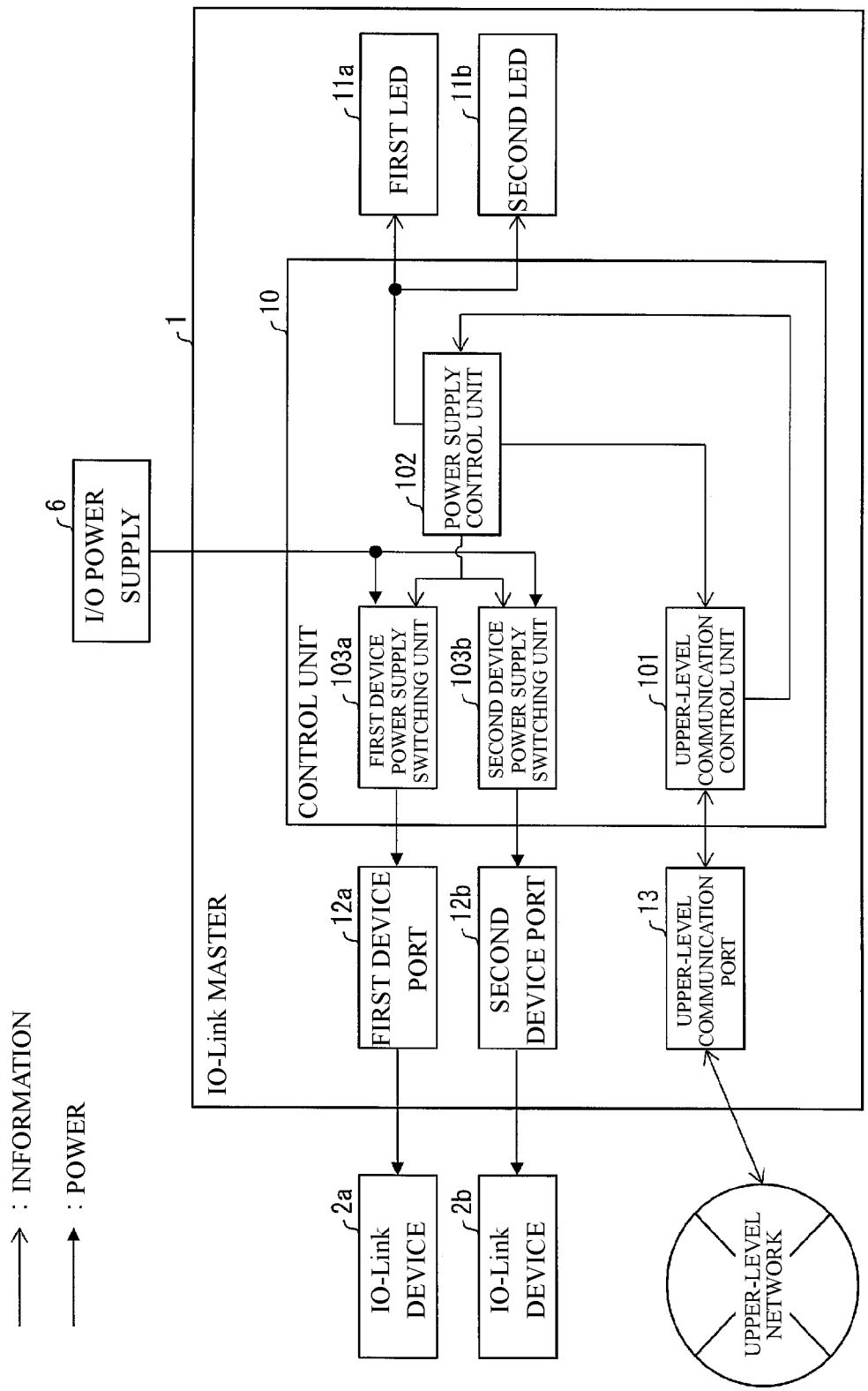
FIG. 1 is a block diagram illustrating one example of the main configuration of an IO-Link master according to Embodiment 1 of the present invention.

Next, the main configuration of the IO-Link master 1 will be described with reference to FIG. 1. FIG. 1 is a block diagram illustrating one example of the main configuration of the IO-Link master 1. As illustrated in the drawing, the IO-Link master 1 includes a control unit 10 that integrally controls each unit of the IO-Link master 1. In addition, the IO-Link master 1 includes a first light emitting diode (LED) 11a and a second LED 11b used for notifying a user whether the power is supplying to each IO-Link device 2 or the supply of power is stopped through turning on/off the lamp. When the first LED 11a and the second LED 11h do not need to be distinguished from each other, each will be denoted as an LED 11. In this embodiment, the LED 11 is in the on state when the power is supplying to a corresponding IO-Link device 2, and the LED 11 is in the off state when the supply of power to a corresponding IO-Link device 2 is stopped. However, a correspondence relation between the power supply state of the IO-Link device 2 and the on/off state of the LED 11 is not limited to this example. In addition, the IO-Link master 1 includes a first device port 12a and a second device port 12b as ports used for communication with the IO-Link device 2 and supplying power to the IO-Link device 2. Here, when the first device port 12a and the second device port 12b do not need to be distinguished from each other, each will be denoted as a device port 12. The number of LEDs 11 and the number of device ports 12 may be three or more, and the number of the LEDs 11 and the number of the device ports 12 are the same. In addition, the IO-Link master 1 includes an upper-level communication port 13 used for communicating with an upper-level network including the controller 3 described above.

The control unit 10 includes an upper-level communication control unit 101 (a designation receiving unit and a state notification unit), a power supply control unit 102, a first device power supply switching unit 103a, and a second device power supply switching unit 103b. While not illustrated in the drawing, the control unit 10 also includes a device communication control unit that controls communication with the IO-Link device 2. The device communication control unit will be described in detail in Embodiment 3 to be described later. When the first device power supply switching unit 103a and the second device power supply switching unit 103b do not need to be distinguished from each other, each will be denoted as a device power supply switching unit 103.

The upper-level communication control unit 101 controls communication with devices such as the controller 3 included in the upper-level network. More specifically, when a power supply stopping instruction and port information are received from the controller 3, the upper-level communication control unit 101 outputs the port information to the power supply control unit 102. In other words, the upper-level communication control unit 101 may be also represented as receiving designation of a target device that is a power supply stopping target. In addition, the upper-level communication control unit 101 transmits the power supply state notification acquired from the power supply control unit 102 to the controller 3.

The power supply control unit 102 controls on/off of the power supply of the IO-Link device 2 by controlling the device power supply switching unit 103. More specifically, when port information is acquired from the upper-level communication control unit 101, the power supply control unit 102 outputs a power supply stopping instruction to the device power supply switching unit 103 used for switching between on/off of the power supply of the IO-Link device 2 from the device port 12 represented by the port information. In other words, the power supply control unit 102 may be represented as stopping the power supply of a target device in a state in which the power supply of devices other than the target device is maintained by controlling the device power supply switching unit 103 corresponding to the target device that is a power supply stopping target.

In addition, when a stop completion notification is acquired from the device power supply switching unit 103, the power supply control unit 102 outputs a power supply state notification including information representing the power supply state of each IO-Link device 2 to the upper-level communication control unit 101 and causes the LED 11 corresponding to the device port 12 from which the power supply is stopped to be in the off state.

The device power supply switching unit 103 (power supply state switching unit) performs switching between the execution of the power supply of the IO-Link device 2 and the slopping of the power supply of the IO-Link device 2 in accordance with an instruction from the power supply control unit 102. In other words, the device power supply switching unit 103 is included for each one port of the IO-Link master 1 and is a software switch corresponding to each of a plurality of IO-Link devices 2. When a power supply stopping instruction is acquired from the power supply control unit 102, the device power supply switching unit 103 stops the power supply of the corresponding IO-Link device 2 and outputs a stop completion notification to the power supply control unit 102.

[Power Supply Stopping Direction]

Figure 3:
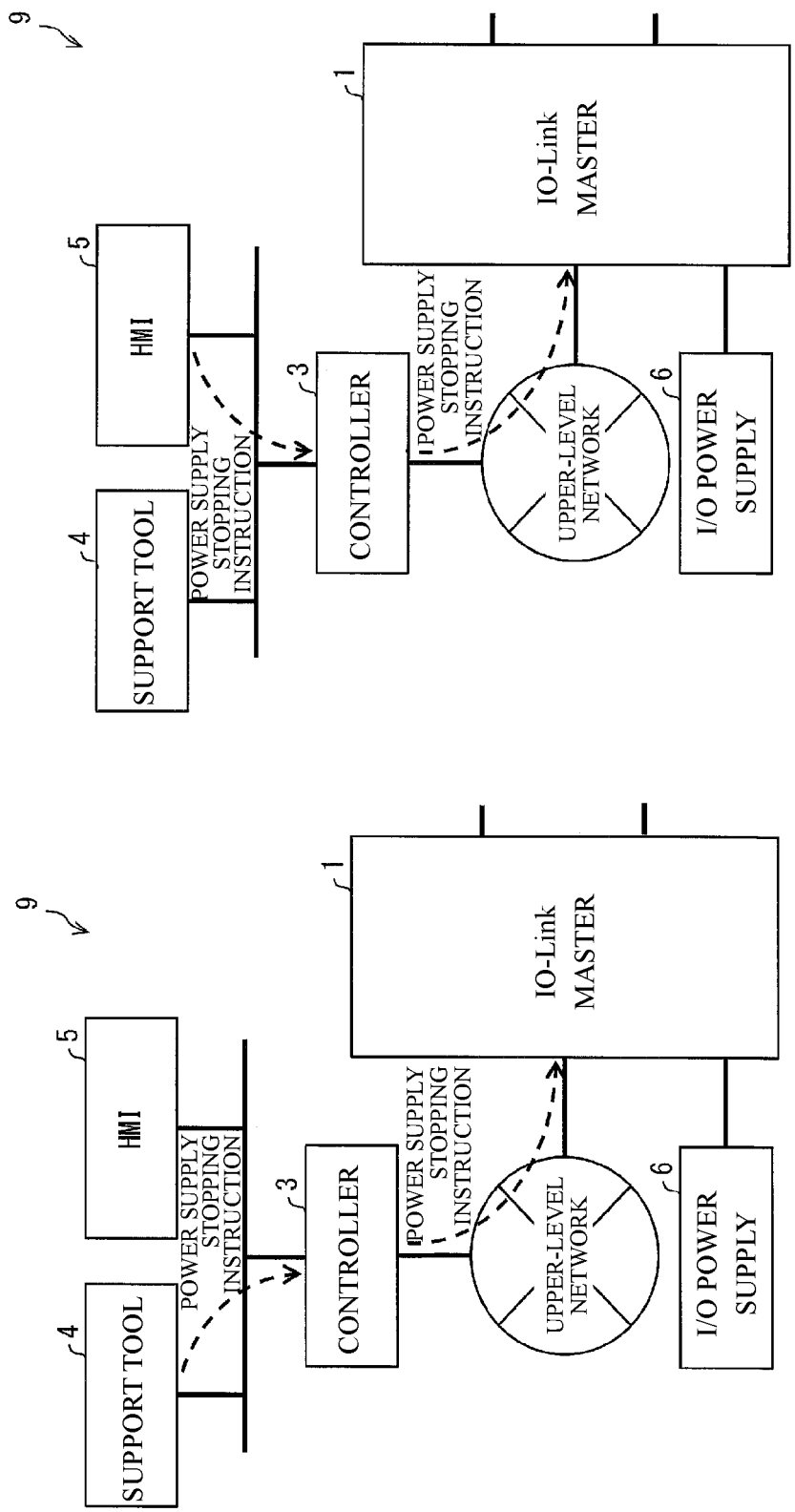
FIG. 3 is a diagram illustrating another example of transmitting a power supply stopping instruction to the IO-Link master illustrated in FIG. 1.

In the example described above, a configuration in which a power supply stopping instruction is transmitted from the controller 3 has been described. However, a device of the upper-level network transmitting the power supply stopping instruction is not limited to the controller 3. This will be described with reference to FIG. 3. FIG. 3 is a diagram illustrating another example of transmitting a power supply stopping direction to the IO-Link master 1.

As illustrated in the left part of the drawing, a power supply stopping instruction can be transmitted from the support tool 4 to the IO-Link master 1 through the controller 3. In addition, as illustrated in the right part of the drawing, a power supply stopping instruction can be transmitted from the HMI 5 to the IO-Link master 1 through the controller 3. While the power supply stopping instruction is executed by transmitting a command of a predetermined format called a message in the IO-Link, the message may be generated by the controller 3, the HMI 5, or the support tool 4. For example, in the example illustrated in the left part of the drawing, the support tools 4 may generate a message of a power supply stopping instruction, and the controller 3 may relay the generated message to the IO-Link master 1. In addition, the controller 3 may generate a message of the power supply stopping instruction in accordance with the power supply stopping instruction from the support tool 4 to the controller 3 and transmit the generated message to the IO-Link master 1. This similarly applies to the example illustrated in the right part of the drawing.

[Flow of Process]

Figure 4:
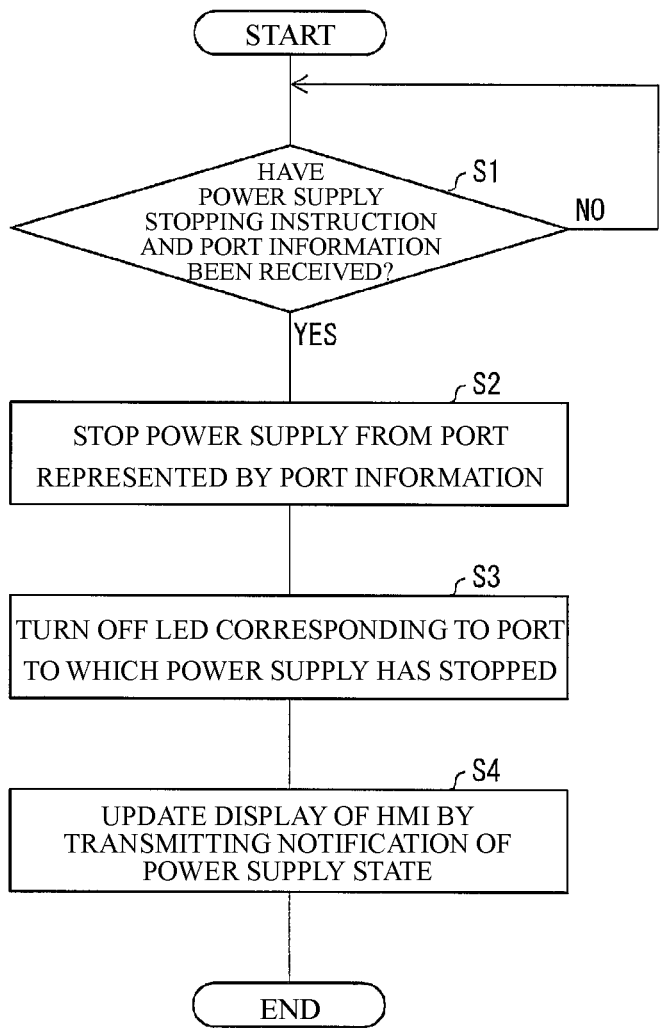
FIG. 4 is a flowchart illustrating one example of a power supply stopping process for an IO-Link device using the IO-Link master illustrated in FIG. 1.

Next, the flow of the process executed by the IO-Link master 1 will be described with reference to FIG. 4. FIG. 4 is a flowchart illustrating one example of a power supply stopping process (a method for controlling the relay device) for the IO-Link device 2 using the IO-Link master 1.

First, the upper-level communication control unit 101 waits for the power supply stopping instruction from the upper-level network (controller 3) (S1; designation receiving step). When the power supply stopping instruction and the port information of the stopping target are acquired (Yes in S1), the upper-level communication control unit 101 outputs the power supply stopping instruction and the port information to the power supply control unit 102. Subsequently, the power supply control unit 102 stops the power supply of the IO-Link device 2 supplied from the device port 12 represented by the port information (S2; power supply control step). More specifically, the power supply control unit 102 stops the power supply of the IO-Link device 2 by controlling the device power supply switching unit 103 corresponding to the device port 12 represented by the acquired port information. In this way, only the power supply of the IO-Link device 2 connected to the device port 12 represented by the acquired port info' nation is stopped.

Subsequently, the device power supply switching unit 103 that has stopped the power supply of the IO-Link device 2 outputs a stop completion notification to the power supply control unit 102. The power supply control unit 102 receives the notification and turns off the LED 11 corresponding to the device port 12 to which the supply of power has stopped (S3). In addition, the power supply control unit 102 outputs a power supply state notification to the upper-level communication control unit 101. The upper-level communication control unit 101 transmits the power supply state notification to the upper-level network to update the display of the HMI 5 (S4). More specifically, the HMI 5 is caused to update the image 51 (see FIG. 2) representing the status of the power supply. For example, the HMI 5 is caused to display an image in which "on" associated with the information representing the IO-Link device 2a is changed to "off." The target displaying the image is not limited to the HMI 5. For example, as in the example illustrated in the left part of FIG. 3, in a case in which a power supply stopping instruction is received from the support tool 4, the image may be displayed on the support tool 4. The processes of Steps S3 and S4 may be reversed in order or performed simultaneously.

[Start (Restart) of Power Supply]

While the stopping of the power supply of the IO-Link device 2 has been described in the example illustrated above, the start (restart) of the power supply is similar thereto. More specifically, the upper-level communication control unit 101 acquires a power supply starting instruction and port information from the upper-level network and outputs the power supply starting instruction and the port information to the power supply control unit 102. The power supply control unit 102 starts (restarts) the power supply of the IO-Link device 2 that is connected to the device port 12 represented by the acquired port information by controlling the device power supply switching unit 103.

In addition, when a start notification representing the start (restart) of the power supply of the IO-Link device 2 is acquired from the device power supply switching unit 103, the power supply control unit 102 turns on the LED 11 corresponding to the device port 12 to which the supply of power has been started (restarted). The HMI 5 displays an image in which "off" associated with the information representing the IO-Link device 2 is changed to "on" in accordance with a direction from the controller 3.

In this way, the IO-Link master 1 can start (restart) only the power supply of a designated IO-Link device 2 among a plurality of IO-Link devices 2.

Embodiment 2

Figure 5:
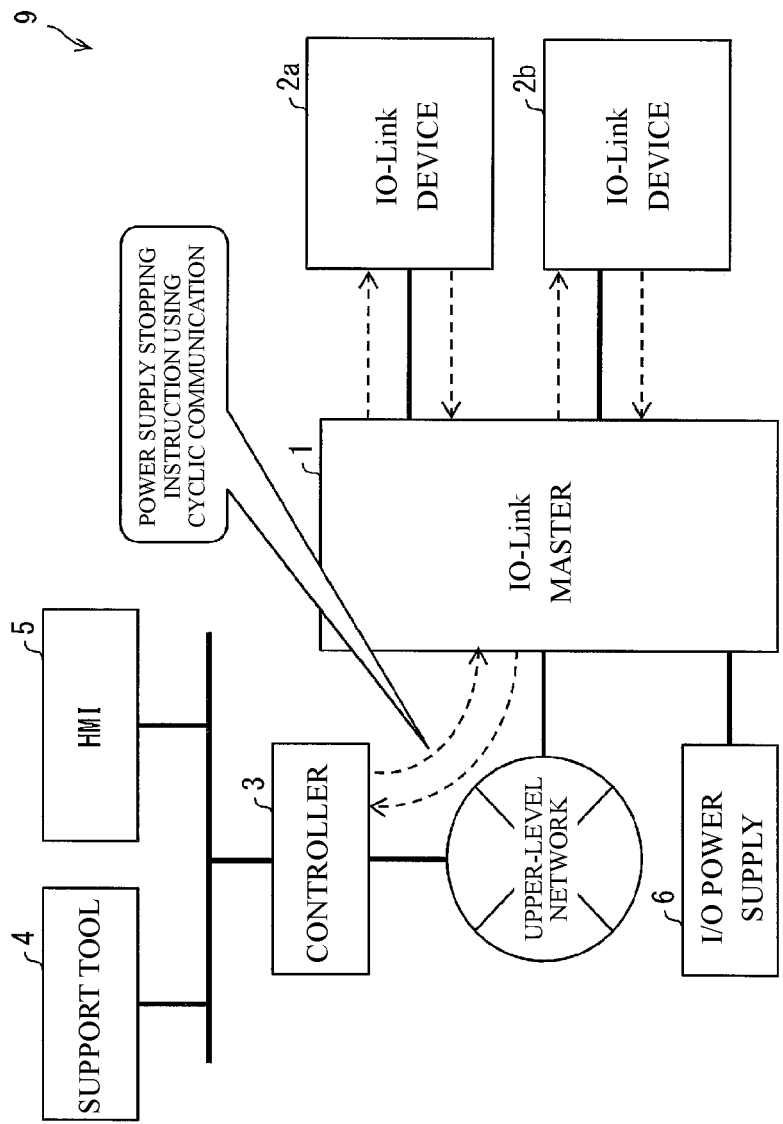
FIG. 5 is a diagram illustrating an IO-Link system according to Embodiment 2 of the present invention, which is an example of an IO-Link system executing a power supply stopping instruction in cyclic communication.

Embodiment 2 of the present invention will be described with reference to FIG. 5. FIG. 5 is a diagram illustrating an example of an IO-Link system 9 executing a power supply stopping instruction in cyclic communication. The same reference numeral will be assigned to a configuration similar to that of the embodiment described above, and the description thereof will not be presented here. This similarly applies also to Embodiment 3 and subsequent embodiments.

In the IO-Link system 9, cyclic communication is executed at a predetermined cycle. More specifically, as illustrated in the drawing, a controller 3 transmits cyclic data to an IO-Link master 1, and the cyclic data is transmitted from the IO-Link master 1 to each IO-Link device 2. Then, the cyclic data is returned to the controller 3 from each IO-Link device 2 through the IO-Link master 1. In this way, the cyclic data is shared by devices configured in the IO-Link system 9.

By including a power supply stopping instruction in this cyclic data, the IO-Link master 1 can be causes to stop the power supply of the IO-Link device 2. More specifically, a flag corresponding to the power supply stopping instruction is included in the cyclic data. The flag is associate with port information representing each device port 12, and the controller 3 executes switching between on/off of this flag. In this way, the IO-Link master 1 can execute switching between the stopping of the power supply of the IO-Link device 2 and the starting of the power supply thereof. More specifically, in a case in which the flag is set to off, the IO-Link master 1 stops the power supply of the IO-Link device 2. On the other hand, in a case in which the flag is set to on, the IO-Link master 1 starts (restarts) the power supply of the IO-Link device 2.

As above, the IO-Link system 9 according to this embodiment includes a flag associated with the port information representing each device port 12 in the cyclic data and thus can stop the power supply of the IO-Link device 2 at a timing at which the controller 3 sets the flag to off.

Embodiment 3

Figure 6:
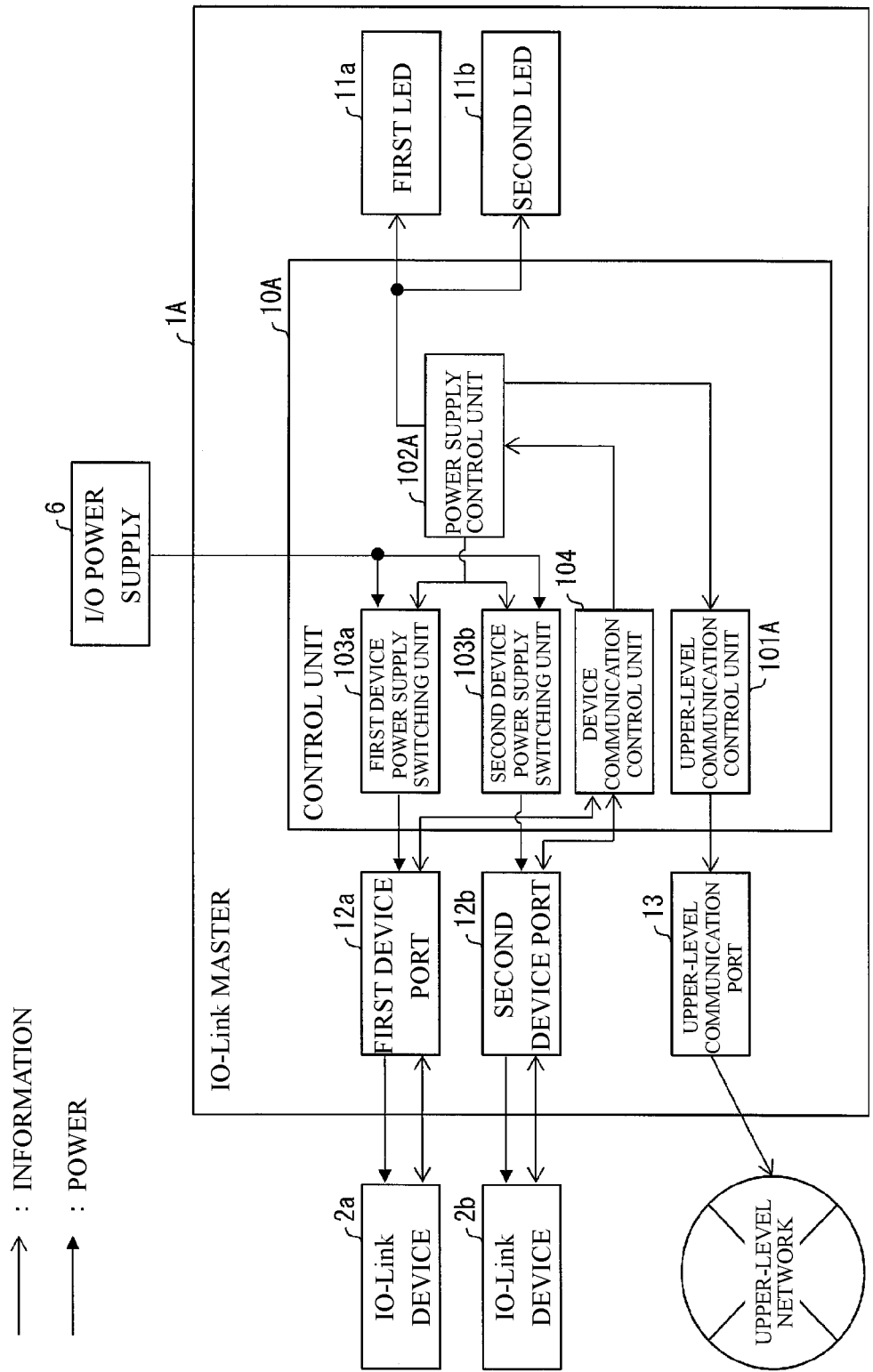
FIG. 6 is a block diagram illustrating one example of the main configuration of an IO-Link master according to Embodiment 3 of the present invention.

Embodiment 3 of the present invention will be described with reference to FIGS. 6 and 7. FIG. 6 is a block diagram illustrating one example of the main configuration of an IO-Link master 1A. In addition, FIG. 7 is a diagram illustrating an overview of the IO-Link system 9A.

Figure 7:
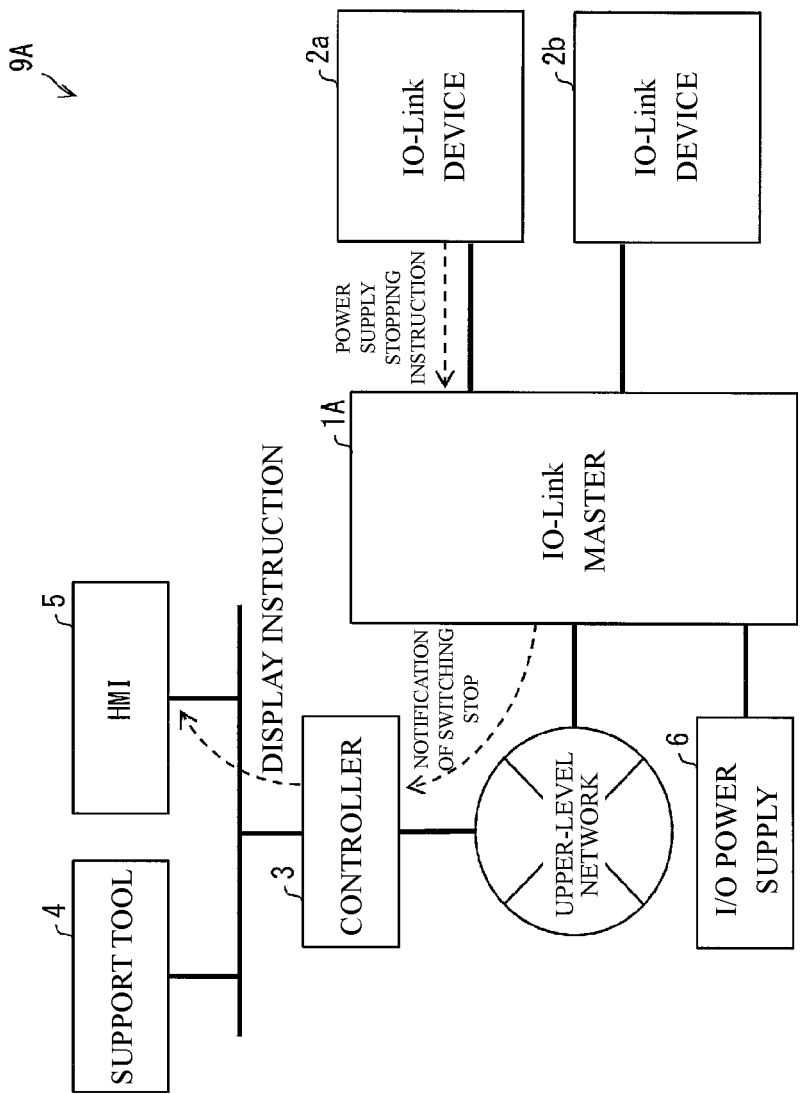
FIG. 7 is diagram illustrating an overview of an IO-Link system according to Embodiment 3 of the present invention.

As illustrated in FIG. 7, although the IO-Link system 9A according to this embodiment is a system having a function similar to the IO-Link system 9 described above, a power supply stopping instruction is transmitted by an IO-Link device 2 to an IO-Link master 1, which is different from that described above. In other words, the IO-Link master 1A according to this embodiment stops only the power supply of the IO-Link device 2 that has transmitted a power supply stopping instruction to its own device. In addition, the power supply stopping instruction from the IO-Link device 2 may be represented as a power supply stop request.

A transmission trigger of the power supply stopping instruction from the IO-Link device 2 is not particularly limited. For example, when a user operates a switch disposed in the IO-Link device 2, the power supply stopping instruction may be transmitted to the IO-Link master 1.

As illustrated in FIG. 6, the IO-Link master 1A, different from the IO-Link master 1 described above, includes a control unit 10A that integrally controls each unit of the IO-Link master 1A instead of the control unit 10. The control unit 10A, different from the control unit 10 described above, includes an upper-level communication control unit 101A, a power supply control unit 102A, and a device communication control unit 104 (designation receiving unit).

The upper-level communication control unit 101A does not receive a power supply stopping instruction and port information from the controller 3, which is different from the upper-level communication control unit 101 described above.

The device communication control unit 104 controls communication with the IO-Link device 2. More specifically, the device communication control unit 104 receives a power supply stopping instruction and device identification information used for identifying the IO-Link device 2 from the IO-Link device 2. Then, the device communication control unit 104 outputs the power supply stopping instruction and the device identification information that have been received to the power supply control unit 102A.

The power supply control unit 102A is different from the power supply control unit 102 described above in the following points. When the device identification information is received, the power supply control unit 102A specifies a device port 12 corresponding to the IO-Link device 2 represented by the device identification information. More specifically, the power supply control unit 102A specifies a device port 12 corresponding to the IO-Link device 2 represented by the acquired device identification information by referring to a table (not illustrated in the drawing) in which the device identification information and the port information are associated with each other. The table may be maintained by the power supply control unit 102A or may be configured to be stored in a storage unit of the IO-Link master 1 not illustrated in the drawing.

Then, the power supply control unit 102A outputs a power supply stopping instruction to the device power supply switching unit 103 corresponding to the specified device port 12. In this way, the supply of power to the IO-Link device 2 that has transmitted the power supply stopping instruction is stopped.

As above, the IO-Link master 1A according to this embodiment stops the power supply of the IO-Link device 2 in accordance with a power supply stopping instruction from the IO-Link device 2. Accordingly, for example, a user can stop the supply of power by operating the IO-Link device 2 when replacing the IO-Link device 2. For this reason, the replacement of the IO-Link device 2 can be smoothly performed.

Embodiment 4

Figure 8:
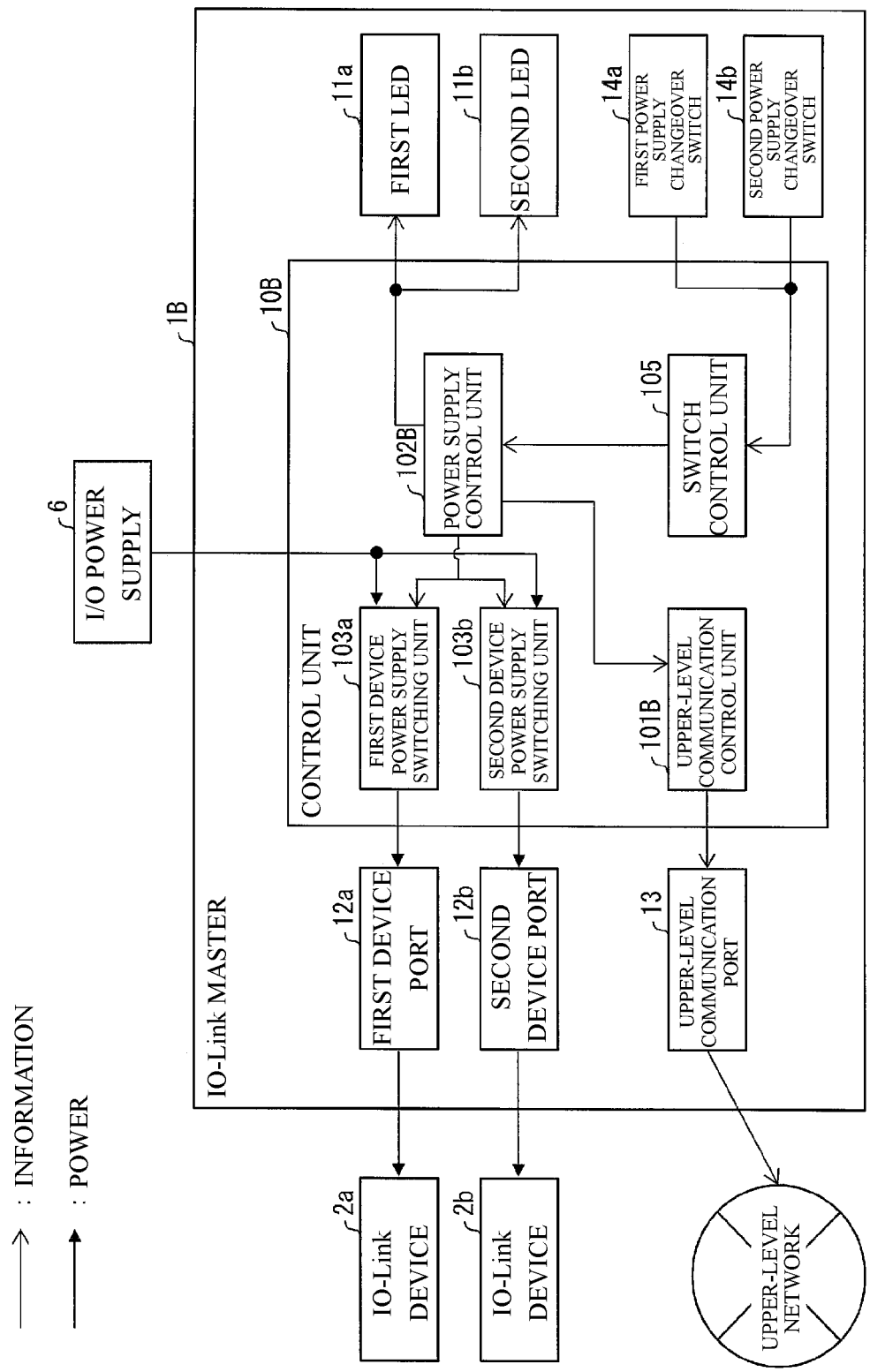
FIG. 8 is a block diagram illustrating one example of the main configuration of an IO-Link master according to Embodiment 4 of the present invention.

Embodiment 4 of the present invention will be described with reference to FIG. 8. FIG. 8 is a block diagram illustrating one example of the main configuration of an IO-Link master 1B.

As illustrated in the drawing, the IO-Link master 1B according to this embodiment, different from the IO-Link master 1 described above, includes a first power supply changeover switch 14a and a second power supply changeover switch 14b. Here, when the first power supply changeover switch 14a and the second power supply changeover switch 14b do not need to be distinguished from each other, each will be denoted as a power supply changeover switch 14.

The power supply changeover switches 14 are a plurality of hardware switches disposed in the IO-Link master 1. More specifically, the power supply changeover switch 14 corresponds to each device port 12 and each IO-Link device 2. For example, the first power supply changeover switch 14a corresponds to a first device port 12a and an IO-Link device 2a.

In addition, the IO-Link master 1B includes a control unit 10B that integrally controls each unit of the IO-Link master 1B instead of the control unit 10. The control unit 10B, different from the control unit 10 described above, includes an upper-level communication control unit 101B, a power supply control unit 102B, and a switch control unit 105 (designation receiving unit). The upper-level communication control unit 101B is similar to the upper-level communication control unit 101A described in Embodiment 3, and thus description thereof will not be presented here.

The switch control unit 105 controls the power supply changeover switches. More specifically, when a user operates the power supply changeover switch 14 to stop the power supply of the IO-Link device 2, the switch control unit 105 outputs switch identification information representing the operated power supply changeover switch 14 and a power supply stopping instruction to the power supply control unit 102B.

The power supply control unit 102B is different from the power supply control unit 102 described above in the following points. When switch identification information is received, the power supply control unit 102B specifies a device port 12 corresponding to the power supply changeover switch 14 represented by the switch identification information. More specifically, the power supply control unit 102B specifies a device port 12 corresponding to the power supply changeover switch 14 represented by the acquired switch identification information by referring to a table (not illustrated in the drawing) in which the switch identification information and the port information are associated with each other. The table may be maintained by the power supply control unit 102B or may be configured to be stored in a storage unit (not illustrated in the drawing) of the IO-Link master 1.

Then, the power supply control unit 102B outputs a power supply stopping instruction to the device power supply switching unit 103 corresponding to the specified device port 12. In this way, the power supply of the IO-Link device 2 that has transmitted the power supply stopping instruction is stopped.

In addition, the power supply changeover switch 14 may be configured to directly block the power supply of the IO-Link device 2 supplied from an I/O power supply 6 in accordance with a user's operation. In the case of this example, in order to turn off the LED 11 and transmit a power supply state notification to the upper-level network, the power supply control unit 102B is preferably configured to be able to detect the power supply changeover switch 14 being operated or to detect the blocking of the power supply supplied from the I/O power supply 6 to the IO-Link device 2 according to the operation.

Embodiment 5

Figure 9:
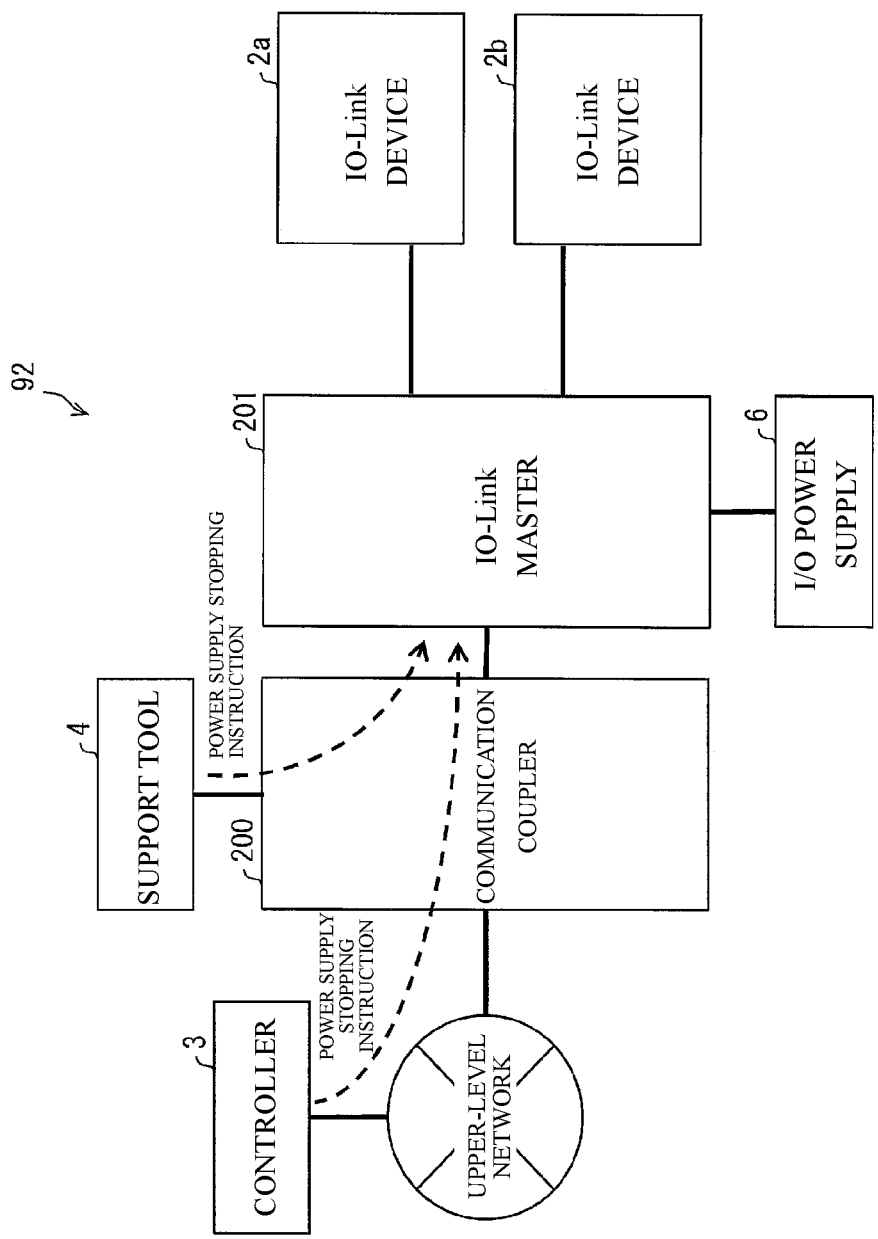
FIG. 9 is a diagram illustrating an IO-Link system according to Embodiment 5 of the present invention, which is an example of an IO-Link system in which a communication function for communicating with an upper-level network in the IO-Link master is separated as a communication coupler.

Embodiment 5 of the present invention will be described with reference to FIG. 9. FIG. 9 is a diagram illustrating an example of an IO-Link system 92 in which a communication function of the IO-Link master for communicating with an upper-level network is separated as a communication coupler.

The IO-Link system 92 illustrated in the drawing is a system having a function similar to that of the IO-Link system 9 described above. Different from the IO-Link system 9, the IO-Link 92 includes a communication coupler 200 and an IO-Link master 201 instead of the IO-Link master 1 of the IO-Link system 9.

The communication coupler 200 is a relay device that relays communication between the upper-level network and the IO-Link master 201. The communication coupler 200 includes a communication port equivalent to the upper-level communication port 13 (see FIG. 1) of the IO-Link master 1 and includes a communication port used for communicating with the IO-Link master 201. The communication coupler 200 includes a communication control unit equivalent to the upper-level communication control unit 101 (see FIG. 1) of the IO-Link master 1 and relays communication between devices included in the upper-level network and the IO-Link master 201 by using the communication control unit.

The IO-Link master 201 has a configuration similar to that of the IO-Link master 1, except for the inclusion of a communication port used for communicating with the communication coupler 200 instead of the upper-level communication port 13 (see FIG. 1).

In the IO-Link system 92, similar to the IO-Link system 9 described above, a power supply stopping instruction is transmitted from the controller 3, and this power supply stopping instruction is received by the IO-Link master 201 through the communication coupler 200. The power supply stopping process after the reception of the power supply stopping instruction is similar to that of the IO-Link master 1, and thus, description thereof will not be repeated here.

In addition, in a case in which the communication coupler 200 includes an interface used for a connection with the support tool 4, as illustrated in FIG. 9, the power supply stopping instruction may be transmitted from the support tool 4 to the communication coupler 200 through the interface. In such a case, the power supply stopping instruction is transmitted from the communication coupler 200 to the IO-Link master 201. In addition, in a case in which the IO-Link master 201 includes an interface used for a connection with the support tool 4, a power supply stopping instruction may be directly transmitted from the support tool 4 to the IO-Link master 201 through the interface. Furthermore, also in the IO-Link system 92, similar to Embodiment 2, a power supply stopping instruction may be transmitted in cyclic communication.

Embodiment 6

Figure 10:
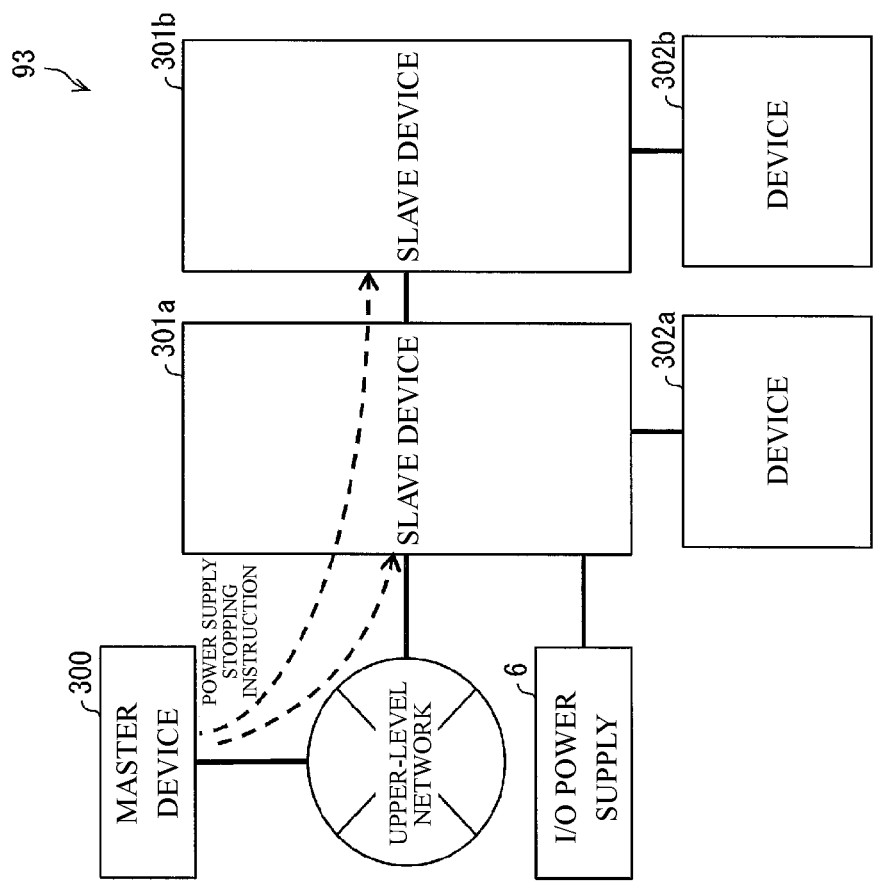
FIG. 10 is a diagram illustrating an FA system according to Embodiment 6 of the present invention, which is an example of an FA system including a plurality of slave devices and a master device controlling these slave devices.

Embodiment 6 of the present invention will be described with reference to FIG. 10. FIG. 10 is a diagram illustrating an example of an FA system 93 including a plurality of slave devices and a master device controlling these slave devices. The FA system 93 illustrated in the drawing has a function similar to that of the IO-Link system 9 described above but is not a system compliant with the IO-Link protocol. The FA system 93, as illustrated in the drawing, includes a master device 300, slave devices 301a and 301b, and devices 302a and 302b. When the slave devices 301a and 301b do not need to be distinguished from each other, each will be denoted as a slave device 301. Similarly, when the devices 302a and 302b do not need to be distinguished from each other, each will be denoted as a device 302.

The master device 300 is a control device controlling each slave device 301 and is a device equivalent to the controller 3 according to the embodiment described above. In addition, the slave device 301 is a device operating in accordance with the control of the master device 300 and is a relay device relaying data between the master device 300 and the device 302. The slave device 301 is a device equivalent to the IO-Link master 1 according to the embodiment described above and can bidirectionally communicate with the device 302. As one difference between the IO-Link master 1 and the slave device 301 is that there is one communication port being included in the slave device 301, used for communicating with the device 302. The device 302 is equivalent to the IO-Link device 2 according to the embodiment described above. For example, in addition to an input device such as a sensor, an output device such as an actuator may be applied as the device 302. For example, such a system can be built using Ethernet control automation technology (EtherCAT; registered trademark).

In addition, the slave device 301, similar to the IO-Link master 1, includes an upper-level communication control unit used for communicating with the upper-level network (master device 300), a device power supply switching unit that stops the power supply of a device designated by the master device 300, and a power supply control unit that controls the device power supply switching unit. Accordingly, the slave device 301 can stop the power supply of a designated device 302 among devices 302 that are targets for the supply of power, while maintaining the power supply of the other devices 302.

Modified Example

In Embodiments 1 to 5, while the FA system using the IO-Link has been described as an example, the present invention can be applied to any FA system supplying power from a slave device to a device. In other words, a communication protocol used in the FA system is not particularly limited. For example, the present invention can be applied to an FA system using CC-Link or the like in addition to the EtherCAT illustrated in Embodiment 6.

[Example of Realization Using Software]

The control blocks (particularly, the units included in the control units 10, 10A, and 10B) of the IO-Link master 1 may be realized by a logic circuit (hardware) formed on an integrated circuit (IC chip) or the like or may be realized by software using a central processing unit (CPU).

In the latter case, the IO-Link master 1 includes: a CPU executing a command of a program that is software realizing each function; a read only memory (ROM) or a storage device (these will be referred to as a recording medium) in which the program and various kinds of data are recorded in a computer (or CPU)-readable manner; a random access memory (RAM) expanding the program; and the like. Then, as the computer (or the CPU) reads the program described above from the recording medium and executes the read program, whereby the object of the present invention is achieved. As the recoding medium, a non-transitory tangible medium such as a tape, a disk, a card, a semiconductor memory, a programmable logic circuit, or the like may be used. In addition, the program described above may be supplied to the computer through an arbitrary transmission medium (a communication network or a broadcast wave, or the like) that can transmit the program. Furthermore, one aspect of the present invention may be realized in the form of a carrier wave-embedded data signal in which the program described above is implemented through electronic transmission. Then, by using a similar technique, control blocks of devices such as the IO-Link master 201, the communication coupler 200, and the slave device 301 may be realized.

The present invention is not limited to each embodiment described above, various changes can be made in a range represented in the claims, and an embodiment acquired by appropriately combining technical means disclosed in different embodiments also belongs to the technical scope of the present invention.

SUMMARY

According to one aspect of the present invention, there is provided a relay device that relays data between a control device and a plurality of devices that are control targets of the control device, and controls the power supply of the plurality of devices and has a configuration including: a designation receiving unit that receives designation of a target device that is a target for stopping the power supply; a plurality of power supply state switching units that correspond to the plurality of devices; and a power supply control unit that stops the power supply of the target device in a state in which the power supply of the other devices is maintained by controlling the power supply state switching unit corresponding to the target device.

According to the configuration described above, the power supply of the target device is stopped in a state in which the power supply of the other devices is maintained by controlling the power supply state switching unit corresponding to the target device among the plurality of power supply state switching units, and accordingly, the power supply of a designated device among a plurality of devices that are targets for the supply of power can be stopped, and the power supply of the other devices can be maintained. Accordingly, for example, when replacing a device, it is capable of only stopping the power supply of the device that is a replacement target, and maintaining the power supply of the other devices.

In addition, in the relay device according to one aspect of the present invention, a state notification unit may be further included which notifies the control device of a power supply state of each of the plurality of devices after the power supply control unit stops the power supply of the target device.

According to the configuration described above, since the power supply state of each of the plurality of devices is notified to the control device, the control device can recognize the power supply states of the plurality of devices after the power supply of the target device is stopped. Accordingly, for example, in a case in which a display device is connected to the control device, the power supply states of the plurality of devices can be displayed on the display device.

In addition, in the relay device according to one aspect of the present invention, the designation receiving unit may receive designation of the target device from a display input device of a touch panel type.

According to the configuration described above, a user can designate a target device by operating the display input device of the touch panel type and accordingly, can easily designate the target device and stop the power supply thereof through an intuitive operation.

In addition, in the relay device according to one aspect of the present invention, each of the plurality of devices may transmit a power supply stopping request to the designation receiving unit, and the designation receiving unit may set the device that transmits the power supply stopping request as the target device.

According to the configuration described above, a user can designate a target device by operating the device. In this way, for example, when replacing a device, the power supply thereof can be stopped by operating the device. In addition, since the power supply of a device is capable of being stopped by only operating the device that is a replacement target, the replacement of the device can be smoothly performed.

In addition, in the relay device according to one aspect of the present invention, communication with the devices may be executed using IO-Link (registered trademark).

According to the configuration described above, communication is executed using IO-Link between the relay device and the devices. As devices communicating with the relay device using a communication protocol (for example, EtherCAT (registered trademark) or the like) other than IO-Link, there are many input devices such as a sensor and the like. In the case of the input devices, even when the power supply of the devices is not stopped, the replacement of devices can be performed relatively securely. On the other hand, as devices communicating with the relay device using IO-Link, the output devices such as an actuator and the like are predicted to be increased. In the case of the output devices, when the device is replaced without stopping the power supplied thereto, there is a possibility that the device operates immediately after the replacement, which is dangerous. In contrast to this, according to the configuration described above, for the relay device and a device communicating with each other using IO-Link, the power supply of the other devices can be maintained while stopping the power supply of the designated device. Accordingly, only the power supply of the designated device can be stopped without influencing the other devices. As above, even in the case of replacement of a device of the output system, replacement can be performed safely.

In addition, in the case of communication using IO-Link, one relay device can be communicably connected to a plurality of devices, and accordingly, in a case in which the power supply to all the devices is stopped when one device is replaced, many operations using the other devices are stopped. In contrast to this, according to the configuration described above, for the delay device and a device communicating with each other using IO-Link, the power supply of the other devices can be maintained while stopping the power supply of a designated device, and accordingly, a device that is a replacement target can be replaced without stopping operations using the other devices.

In addition, according to one aspect of the present invention, there is provided a control method for a relay device that relays data between a control device and a plurality of devices that are control targets of the control device, and controls the power supply of the plurality of devices, the control method including: a designation receiving step of receiving designation of a target device that is a target for stopping the supply of power; and a power supply control step of stopping the power supply of the target device in a state in which the power supply of the other devices is maintained by controlling a power supply state switching unit corresponding to the target device among a plurality of power supply state switching units that correspond to the plurality of devices. According to the configuration described above, the same effects as those of the relay device can be acquired.

The relay device according to one aspect of the present invention may be realized by a computer. In such a case, by operating the computer as each unit included in the relay device, a control program for a relay device realizing the relay device using a computer and a computer-readable recording medium having recorded the control program thereon belong to the categories of the present invention.

The invention claimed is:

1. A relay, in a factory automation system, configured to relay multiple-byte cyclic data from a control device to a plurality of devices being control targets of the control device and back to the control device via three-wire type cables at a predetermined cycle, and to control power supplies of the plurality of devices supplied by the relay by executing a power supply stopping instruction in the cyclic data, the relay comprising:

a plurality of power supply state switching units corresponding to the plurality of devices;
a processor;
a memory comprising instructions to be executed by the processor, wherein the processor is configured to execute to achieve:
  a designation receiving unit of the relay is configured to receive the cyclic data at the predetermined cycle including a flag associated with port information representing a port of a target device that is a target for stopping the power supply;
  a power supply control unit of the relay is configured to stop the power supply of the target device at the time the control device sets the flag of the target device to off in which the power supplies of the other devices are maintained by controlling the power supply state switching unit corresponding to the target device, and to acquire a stop completion notification; and
wherein each of the plurality of devices is capable of transmitting a power supply stopping request to the designation receiving unit, and wherein the designation receiving unit sets the device that transmits the power supply stopping request as the target device.

2. The relay according to claim 1, wherein the processor is further configured to execute to achieve:
a state notification unit is configured to notify the control device of a power supply state of each of the plurality of devices after the power supply control unit stops the power supply of the target device.

3. The relay according to claim 1, wherein the designation receiving unit receives designation of the target device from a display input device of a touch panel type.

4. The relay according to claim 1, wherein communication with the devices is executed using IO-Link.

5. A control method for a relay in a factory automation system configured to relay multiple-byte cyclic data from a control device to a plurality of devices being control targets of the control device and back to the control device via three-wire type cables at a predetermined cycle, and to control power supplies of the plurality of devices supplied by the relay by executing a power supply stopping instruction in the cyclic data, the control method comprising:
a designation receiving step of receiving the cyclic data at the predetermined cycle including a flag associated with port information representing a port of a target device that is a target for stopping the power supply;
a power supply control step of stopping the power supply of the target device at the time the control device sets the flag of the target device to off in which the power supplies of the other devices are maintained by controlling a power supply state switching unit corresponding to the target device among a plurality of power supply state switching units of the relay corresponding to the plurality of devices, and acquiring a stop completion notification; and
wherein each of the plurality of devices is capable of transmitting a power supply stopping request to a designation receiving unit of the relay, and wherein the designation receiving unit sets the device that transmits the power supply stopping request as the target device.

6. A non-transitory computer-readable recording medium, storing a control program for causing a computer to execute a control method for a relay in a factory automation system configured to relay multiple-byte cyclic data from a control device to a plurality of devices being control targets of the control device and back to the control device via three-wire type cables at a predetermined cycle, and to control power supplies of the plurality of devices supplied by the relay by executing a power supply stopping instruction in the cyclic data, wherein the method comprises:

a designation receiving step of receiving the cyclic data at the predetermined cycle including a flag associated with port information representing a port of a target device that is a target for stopping the power supply;

a power supply control step of stopping the power supply of the target device at the time the control device sets the flag of the target device to off in which the power supplies of the other devices are maintained by controlling a power supply state switching unit corresponding to the target device among a plurality of power supply state switching units of the relay corresponding to the plurality of devices, and acquiring a stop completion notification; and wherein each of the plurality of devices is capable of transmitting a power supply stopping request to a designation receiving unit of the relay, and wherein the designation receiving unit sets the device that transmits the power supply stopping request as the target device.

7. The relay according to claim 2, wherein the designation receiving unit receives designation of the target device from a display input device of a touch panel type.

8. The relay according to claim 2, wherein communication with the devices is executed using IO-Link.

9. The relay according to claim 3, wherein communication with the devices is executed using IO-Link.

10. The relay according to claim 7, wherein communication with the devices is executed using IO-Link.

11. The relay according to claim 1, wherein a cyclic communication is executed at the predetermined cycle, in which the control device sends the cyclic data to each of the plurality of devices through the relay, and when the control device switches the flag to off, the power supply control unit stops the power supply to the target device.

12. The relay according to claim 1, wherein the plurality of devices are sensors, actuators, or both.

* * * * *